United States Patent [19]

Davies

[11] Patent Number: 5,413,433
[45] Date of Patent: May 9, 1995

[54] TREATMENT OF MINERAL TAILINGS

[76] Inventor: Peter Davies, P.O. Box 2328, Durban 4000, South Africa

[21] Appl. No.: 21,079

[22] Filed: Feb. 23, 1993

[30] Foreign Application Priority Data

Feb. 24, 1992 [ZA] South Africa .................. 92/1312

[51] Int. Cl.$^6$ .................. C02F 1/00; E02D 17/18
[52] U.S. Cl. .................. 405/129; 405/52; 405/266; 405/258
[58] Field of Search .................. 405/128, 129, 263, 52, 405/53, 258; 210/747, 751

[56] References Cited

U.S. PATENT DOCUMENTS

| | | |
|---|---|---|
| 3,586,624 | 6/1971 | Larson .................. 405/129 |
| 4,526,615 | 7/1985 | Johnson .................. 405/129 X |
| 4,990,031 | 2/1991 | Blowes et al. .................. 405/263 |
| 5,090,843 | 2/1992 | Grigsby .................. 405/129 |

Primary Examiner—Dennis L. Taylor
Attorney, Agent, or Firm—Young & Thompson

[57] ABSTRACT

A method of treating mineral tailings such as those derived from mining operations includes the steps of separating the slimes, forming alternate layers of slimes and a coarse material between peripheral berms and intermediate berms, the berms being of a coarse material, and allowing water to pass therethrough and away from the berms. The water moves through the berms by virtue of the pressure exerted on the lower layers by the mass of the layers above. The coarse material may be the coarse fraction of the mineral tailings.

7 Claims, 2 Drawing Sheets

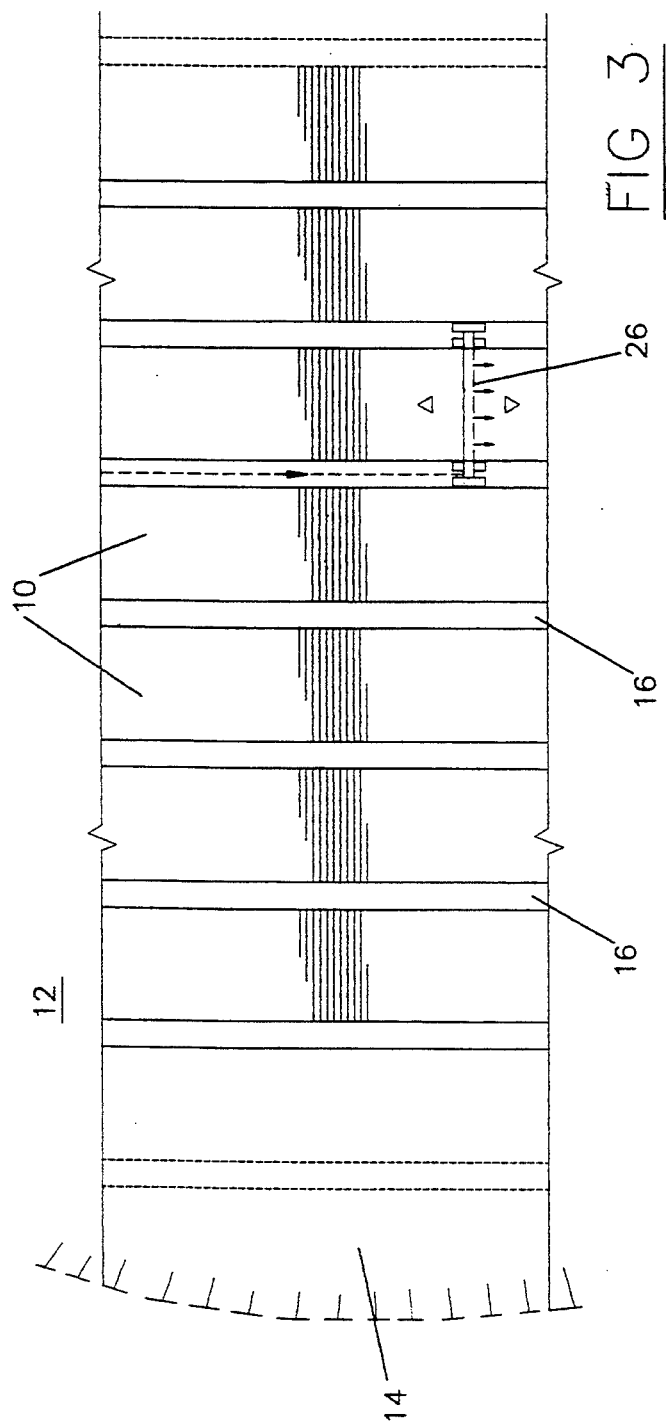
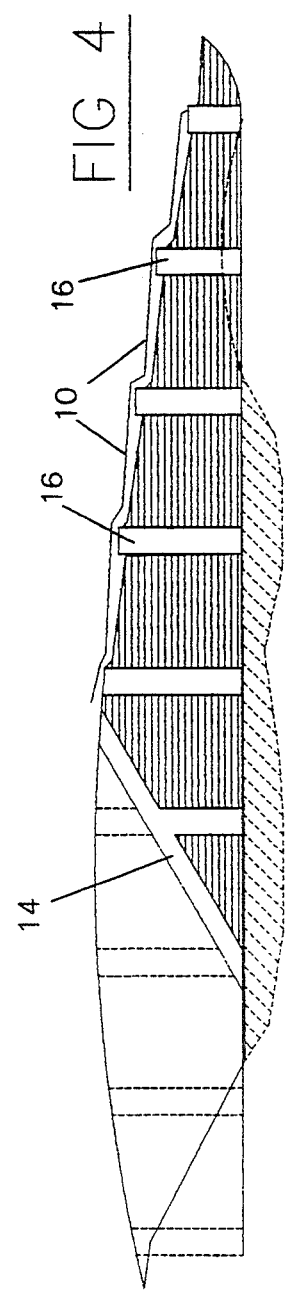

TREATMENT OF MINERAL TAILINGS

FIELD OF THE INVENTION

This invention relates to mineral tailings.

BACKGROUND OF THE INVENTION

Mineral tailings from many metallurgical process comprise a mixture of slimes (usually clay, silt and other fine particles in aqueous suspension) and coarser material, the proportions being dictated by many parameters.

These tailings are generally pumped to a location to form a slimes dam in which the fine material remains in suspension for an inconveniently long time.

Thus, where it is necessary or desirable to achieve rapid dewatering of slimes tailings on placement so as to minimize air space requirements for stacking, accelerate time dependent settlements of the tailings stack, and accelerate the increase in shear strength of the slimes tailings placed, the characteristics of a slimes dam constitute a serious disadvantage. It is an object of the present invention to provide a method of treating tailings which results in a substantial decrease in the time taken for the slimes to separate into water and fines with a low moisture content. This method makes it possible to reconstitute an ore body such as a sand dune by means of tailings placement.

PRIOR ART

A search in the European Patent Office has been made and the following references were cited:

Japanese Patent No. 790140779 (Mitsubishi) U.S. Pat. No. 4,448,690 (Maphis) U.S. Pat. No. 4,541,752 (Phillips).

The Mitsubishi patent relates to the loading of coarse granular coal in which a slurry of coal and water is pumped to a silo in which the slurry is separated into grain fractions; the slime is concentrated and is dehydrated and then mixed into a coal feeder. This patent is not considered to be pertinent to tile present art.

The Maphis patent relates primarily to the treatment of organic sludge. The sludge is introduced into a bed of sand and subjected to aerobic treatment. The water gravitates to drains and is removed. The bed is constantly disturbed by means of a sub surface injection means. This patent is not considered to be pertinent to the present invention.

The Phillips patent describes a method of treating slurries of fine tailings by forming bunds made from the dried tailings. The first (lowermost) stage of the bund is formed first and the slurry is then introduced against it. Due to the angle of repose, the water drains off away from the bund and tile tailings adjacent the bund are dried first and serve to reinforce and consolidate the bund. Some of the dried tailings are used to form the next stage of the bund and the process is repeated. Drainage is provided towards the center of the area of the dam. A perimeter pipe is provided around the top of the bund with spaced discharge points.

It is believed that the Phillips invention will not be as versatile as the present invention for several reasons. Most importantly the present invention is capable of achieving consolidation and drainage of slimes materials having far slower drainage characteristics than those treatable by the Phillips invention (the present invention can treat slimes with a coefficient of consolidation of the order of 0.5 m$^2$/year as compared with treatment by the Phillips invention of material having a typical coefficient of consolidation of 31.54 m$^2$/year).

In addition the present invention allows drainage over the whole area as compared to the preferential drainage near bunds of Phillips. Thus, whereas the Phillips invention relies on the semi-fluid mass of tailings within being retained by the stabilizing action of the peripheral bunds formed by dried tailings, the present invention allows continuous drainage and increase in shear strength at all points within the tailings stack so as to create a stable free-standing platform.

Phillips relies mainly on the weather to dry the mud whereas the present invention relies on drainage. The high rate of drainage achieved by the present invention relies on the placement of alternate thin layers of fine and coarse grained material which consolidate and drain under the mass of material placed above.

Phillips requires a graded filter at the base of the tailings stack together with agricultural drains. The present invention relies on a layer of coarse fraction of the slurry at the base and does not require the use of agricultural drains.

The present invention also includes the use of intermediate berms (bunds) which assist in the drainage of the water from the layers.

SUMMARY THE INVENTION

According to the invention a method of treating mineral tailings includes the steps of separating the slimes portion from the tailings and forming layers of the slimes and a coarser material alternately between berms constructed of material coarser than the slimes and adapted to receive the water from the slimes layers due to pressure exerted on such layers by the layers above. The berms and the coarser layers are conveniently made from the coarser material separated from the slimes, but it will be appreciated that some tailings may not include enough coarse material for this purpose and it will therefore be necessary to use other sand or synthetic material such as drainage sheets.

In a preferred form of the invention paddocks or troughs are first prepared with peripheral and intermediate berms. The number and thickness of the berms will be determined by the nature of the slimes and the availability of sand or coarser material in the tailings, and on other parameters.

Subsoil drains may be provided in the berms to fall longitudinally.

A typical sub-soil drain comprises a filter sand backfill and pipe bedding with perforated plastic subsoil drainage units (for example NETLON (Regd. Trade Mark) "M" type).

The filter sand is preferably the coarse sand fraction of the tailings.

The paddocks are conveniently formed in the zone which has been mined and the product treated metallurgically, care being taken not to impinge on neighbouring zones which still have to be mined and treated. The edge berms may be raked on their outer surfaces in order to promote stability of the tailings stack.

The internal berms may be rectangular in plan to form columns.

BRIEF DESCRIPTION OF THE DRAWINGS

An embodiment of the invention will be described with reference to the accompanying drawings in which:

FIG. 3 is a plan view of several paddock; and

FIG. 4 is a sectional side view of a reconstituted sand dune.

DETAILED DESCRIPTION OF THE INVENTION

Figure 1:
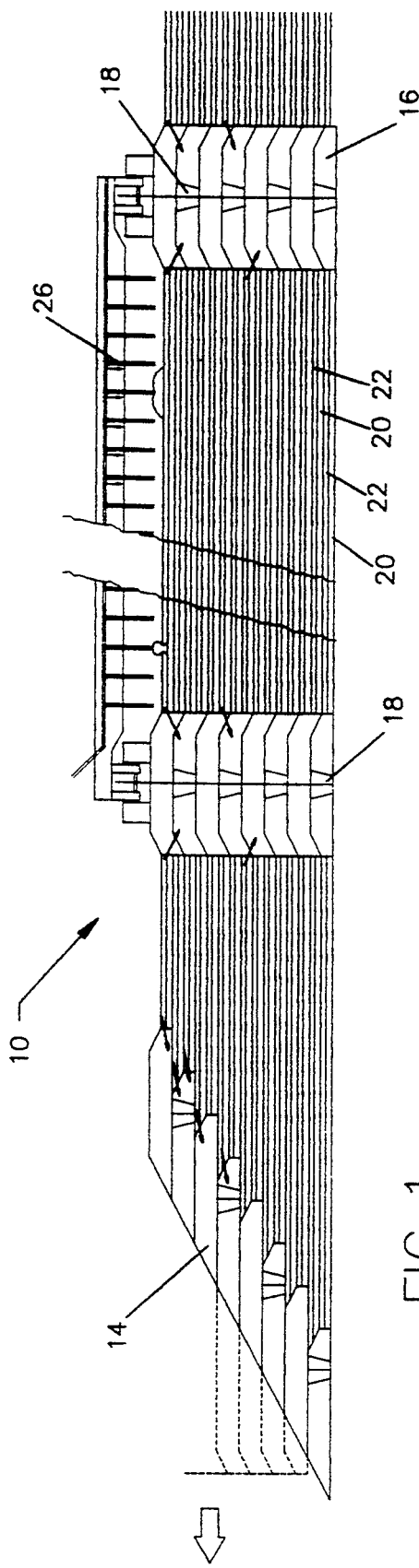
FIG. 1 is a sectional side view through a paddock.
Figure 2:
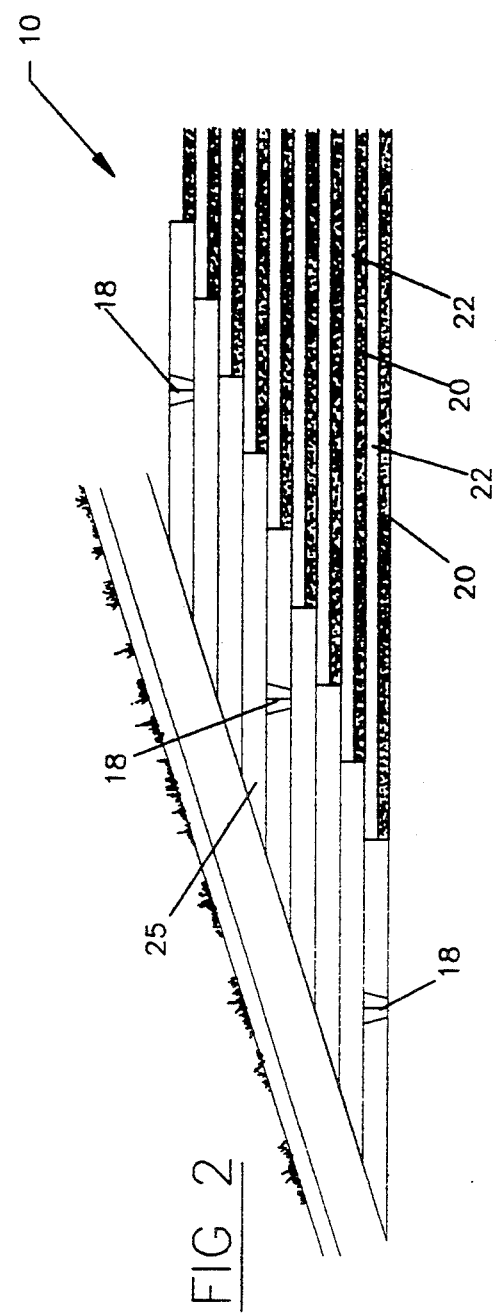
FIG. 2 is a similar view of an end berm.

In the drawings, paddocks 10 are formed in a zone of a mineral-mining project which has already been mined and the extracted material treated metallurgically.

The tailings from the metallurgical process are separated into slimes and coarser material and the coarser material is layered to form edge berms 14, intermediate berms 16 and end berms 25. These berms include subsoil drains 18 to fall longitudinally. As mentioned above there may be an insufficient amount of coarser material, or it may not be suitable and it will then be necessary to use other sand or synthetic drainage sheets.

The slimes and coarser fraction are layered alternately in layers 22 (slimes) and 20 (coarser or sand fraction) and it will be appreciated that as the layers increase, the pressure on the lowermost slimes layers increases and results in water being forced out of the slimes layers upwards and downwards into the adjacent coarser fraction layers and thence horizontally towards and into tile berms from which tile water drains away.

The layers may be of the order of 20 cm deep and the layers are formed by means of a travelling boom 26 which causes first a slimes layer to be formed by a spraying action and then a coarser material layer by a sprinkling action so as not to disturb the slimes layers.

Alternatively, separate slimes and coarser material booms or other mechanism or device may be provided.

The present invention permits sand dunes and other ore bodies to be mined and treated for recovery of titanium or other mineral values and to be almost immediately re-constituted thereby avoiding unacceptable slimes dams and satisfying aesthetic and conservation requirements and demands. It further allows rapid dewatering of slimes tailings on placement, minimises air space requirements for stacking, accelerates time dependent settlements of the tailings stack and accelerates the increase in shear strength of the slimes tailings placed.

I claim:

1. A method of treating mineral tailings containing slimes and a coarser fraction, which comprises: separating the slimes from the tailings and forming a plurality of superimposed alternating layers of slimes and coarser fraction between berms constructed of a material coarser than the slimes, whereby due to pressure exerted on lower slimes layers by upper layers, water from said slimes layer is forced out of said slimes layer into adjacent layers of coarser fraction, and thereafter horizontally towards and into said berms from which said water drains away.

2. The method of claim 1, wherein the plurality of superimposed layers are formed between peripheral and intermediate berms.

3. The method of claim 2, wherein the berms are constructed of a coarser material derived from the coarse fraction of the slimes.

4. The method of claim 1, further comprising the step of initially preparing paddocks having peripheral and intermediate berms.

5. The method of claim 1, further comprising the step of providing subsoil drains in the berms to fall longitudinally.

6. The method of claim 2, wherein the intermediate berms are rectangular in section.

7. The method of claim 1, wherein the coarser fraction is used in combination with synthetic drainage sheets.

* * * * *